US008340867B2

(12) United States Patent
Maruyama et al.

(10) Patent No.: US 8,340,867 B2
(45) Date of Patent: *Dec. 25, 2012

(54) STEERING SYSTEM

(75) Inventors: Kouhei Maruyama, Wako (JP); Yasuhiro Terada, Wako (JP); Yutaka Horiuchi, Wako (JP); Nobuo Sugitani, Wako (JP); Takashi Yanagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 13/095,979

(22) Filed: Apr. 28, 2011

(65) Prior Publication Data

US 2011/0202239 A1    Aug. 18, 2011

Related U.S. Application Data

(62) Division of application No. 12/028,279, filed on Feb. 8, 2008, now Pat. No. 7,954,827.

(30) Foreign Application Priority Data

Feb. 16, 2007 (JP) ................................ 2007-036696

(51) Int. Cl.
    *B62D 12/00* (2006.01)
(52) U.S. Cl. ........................ 701/41; 180/6.44; 280/5.522
(58) Field of Classification Search .................... 701/41, 701/48; 180/6.2, 6.24, 204, 234, 252, 412, 180/413, 423, 443, 445, 6.44; 280/5.5, 5.51, 280/5.52, 5.522
See application file for complete search history.

(56) References Cited

U.S. PATENT DOCUMENTS

| 4,796,720 | A | | 1/1989 | Bauer |
| 4,811,969 | A | * | 3/1989 | Sugiyama ................. 280/5.522 |
| 4,971,348 | A | | 11/1990 | Oyama et al. |
| 5,027,275 | A | * | 6/1991 | Sakamoto et al. .............. 701/36 |
| 5,088,040 | A | | 2/1992 | Matsuda et al. |
| 5,559,698 | A | * | 9/1996 | Hwang ........................... 701/36 |
| 6,926,299 | B2 | | 8/2005 | Yoneda et al. |
| 6,929,086 | B1 | | 8/2005 | Husain et al. |
| 2002/0019690 | A1 | * | 2/2002 | Kurishige et al. .............. 701/41 |

(Continued)

FOREIGN PATENT DOCUMENTS

EP    0 150 857    8/1985

(Continued)

*Primary Examiner* — Thomas Black
*Assistant Examiner* — Ce Li
(74) *Attorney, Agent, or Firm* — Rankin, Hill & Clark LLP

(57) ABSTRACT

A steering controller for an electric power steering device 110 includes a base signal computing part 51 for computing a base signal $D_T$ in accordance with at least the steering torque; a damper compensation signal computing part 52 for computing a damper compensation signal in accordance with an angular velocity of an electric motor 4 or a speed of steering wheel turn; and an inertia compensation signal computing part 53 for compensating inertia and viscosity in the steering unit. The electric motor is driven by a target signal $IM_1$ obtained by compensating the base signal with a damper compensation signal and an inertia compensation signal, to provide a steering auxiliary force. The target signal of the auxiliary torque is compensated so that a difference between a reference self-aligning torque of front wheel in a front wheel steering vehicle and a self-aligning torque of front wheel in an all-wheel steering vehicle is provided to a driver as a responsive feeling from the steering torque.

2 Claims, 11 Drawing Sheets

U.S. PATENT DOCUMENTS

| | | |
|---|---|---|
| 2003/0168275 A1 | 9/2003 | Sakugawa |
| 2005/0178606 A1* | 8/2005 | Husain et al. ................ 180/408 |
| 2006/0169523 A1* | 8/2006 | Yoneda et al. ................ 180/421 |
| 2008/0201037 A1 | 8/2008 | Suyama et al. |
| 2008/0203690 A1 | 8/2008 | Horiuchi et al. |
| 2008/0243339 A1 | 10/2008 | Nishimori et al. |
| 2009/0140502 A1 | 6/2009 | Sasaki et al. |

FOREIGN PATENT DOCUMENTS

| | | | |
|---|---|---|---|
| EP | 0 246 116 | | 11/1987 |
| EP | 1 127 775 | | 8/2001 |
| GB | 2 155 869 | | 10/1985 |
| GB | 2 203 711 | | 10/1988 |
| JP | 02144206 | | 6/1990 |
| JP | 03239674 | | 10/1991 |
| JP | 6-47388 | | 6/1994 |
| JP | 2000-177615 | | 6/2000 |
| JP | 2002-059855 | | 2/2002 |
| JP | 2006-192981 | | 7/2006 |
| JP | 2007-008242 | | 1/2007 |
| JP | 2007-022365 | * | 1/2007 |
| JP | 2007-022365 | | 2/2007 |
| KR | 2004082154 | | 9/2004 |

* cited by examiner

STEERING SYSTEM

CROSS-REFERENCE TO RELATED APPLICATIONS

This application claims the foreign priority benefit under Title 35, United States Code, section 119 (a)-(d), of Japanese Patent Application No. 2007-036696, filed on Feb. 16, 2007 in the Japan Patent Office, the disclosure of which is herein incorporated by reference in its entirety.

BACKGROUND OF THE INVENTION

1. Field of the Invention

The present invention relates to a steering system in which an operation of toe angle of rear wheels is controlled based on a turning angle of front wheels and a vehicle speed, and particularly to a steering system in combination with an electric power steering device which assists steering wheel turn of the front wheels.

2. Description of the Related Art

An electric power steering device is a device in which an electric motor generates an auxiliary torque in accordance with a magnitude of a steering torque, and the auxiliary torque is transmitted to a steering unit, to thereby reduce a steering effort required by a driver for steering. There is disclosed a technique in which a base current (assist torque) determined by a steering torque and a vehicle speed is compensated by inertia and damping (viscosity) in the steering unit, and the compensated current is used as a target current for controlling an electric motor (see Japanese patent application unexamined publications No. 2002-59855 (FIG. 2) and No. 2000-177615 (FIG. 2)).

As an electric motor for such an electric power steering device, a brushless motor is disclosed in Japanese patent application unexamined publication No. 2004-322814 (or corresponding U.S. Pat. No. 6,926,299) (FIGS. 2 and 3).

Also in Japanese patent application examined publication H6-47388 (FIG. 2), there is disclosed an all-wheel independent steering device in which operation of all running wheels are individually controlled based on an operation angle of steering wheels and a vehicle speed.

In Japanese patent application unexamined publication No. 2002-59855, properties including a base current, damping and inertia are computed using a base table, a damper table and an inertia table which substantially has a differential property, respectively. Herein, setting of each table, which includes functions of steering torque, vehicle speed and electric motor angular velocity, will be discussed. The base table is set in such a manner that a driver is provided with road information and a steady responsive feeling from a steering torque, in accordance with an increase in the vehicle speed, and thus it is required that a gain be made lower when the vehicle speed is higher, and that a dead zone is set larger for giving a larger manual steering zone. The base table is also set so as to give an excellent steering feeling, and therefore, it is required that a response lag, which may otherwise be caused by electric motor inertia, viscosity or the like, be reduced by using the inertia table.

The inertia table is set so as to improve vehicle properties by improving response of the steering wheel and also convergence of the steering wheel position, by cooperating with a steering damper effect. Therefore, it is required that the inertia table be substantially provided with a differential property based on the steering torque, to thereby increase or decrease an assist on the electric motor in accordance with the changed portion of the steering torque, i.e., a rotational acceleration (steering rotational acceleration) of the electric motor.

However, in a case of a steering system in which a toe angle changer which controls an operation of a toe angle of rear wheel, based on an operation angle of a steering wheel or a turning angle of front wheel as well as a vehicle speed, is combined with an electric power steering device, a responsive feeling from a steering torque given by the electric power steering device of the vehicle having the above-mentioned steering system may bring discomfort to a driver who is used to a responsive feeling from the steering torque given by an electric power steering device of a vehicle that has only a front wheel steering function.

In addition, even when the toe angle changer is in an abnormal state (for example, the toe angle of the rear wheel is locked) or when the steering of the front wheel is assisted by the electric power steering device, the driver may not feel any anomaly in the responsive feeling from the steering torque, and may keep operating the steering wheel in the same manner.

Therefore, it would be desirable to provide a steering system that solves the above-mentioned problems.

SUMMARY OF THE INVENTION

In one aspect of the present invention, there is provided a steering system including: an electric power steering device which includes a steering unit of front wheels having an electric motor configured to generate an auxiliary torque in accordance with at least a steering torque, and is configured to transmit the auxiliary torque to the steering unit; toe angle changers capable of changing toe angles of respective right and left rear wheels in accordance with at least a turning angle of the front wheels and a vehicle speed; and a steering controller configured to control the electric power steering device and the toe angle changer, the steering controller including: an auxiliary torque calculating unit configured to calculate a target value of the auxiliary torque and to output a target signal for driving the electric motor, in which a difference between a first self-aligning torque generated at the front wheels and a second self-aligning torque generated at front wheels of a hypothetical vehicle having only a front wheel steering function is compensated.

According to this steering system, the steering controller can compensate the target signal of the auxiliary torque on the front wheel steering, in such a manner that a responsive feeling from the steering torque on the steering wheel of a vehicle, during turning motion or lateral-directional motion with activation of the toe angle changer, becomes the same as the responsive feeling from the steering torque in the case of a vehicle having only a front wheel steering function.

It is preferable in the steering system that the steering controller further includes a restoring torque calculating unit configured to calculate the first self-aligning torque based on at least a yaw rate, speed and slip angle of the vehicle and the turning angle of the front wheels, a reference restoring torque calculating unit configured to calculate the second self-aligning torque based on at least the vehicle speed and the turning angle of the front wheels, and a difference compensation unit configured to calculate a difference between the first self-aligning torque and the second self-aligning torque and to compensate the target signal with the difference.

According to this feature, the first self-aligning torque can be calculated in the restoring torque calculating unit, based on at least the yaw rate, the vehicle speed, the slip angle and the turning angle of the front wheel of the vehicle; a second self-aligning torque generated at the front wheel in the case of a vehicle having only a front wheel steering function can be calculated in the reference restoring torque calculating unit, based on at least the vehicle speed and the turning angle of the front wheel of the vehicle; and the target signal can be compensated based on a difference between the first self-aligning torque and the second self-aligning torque.

In another aspect of the present invention, there is provided a steering system including: an electric power steering device which includes a steering unit of front wheels having an electric motor configured to generate an auxiliary torque in accordance with at least a steering torque, and is configured to transmit the auxiliary torque to the steering unit; toe angle changers capable of changing toe angles of respective right and left rear wheels in accordance with at least a turning angle of the front wheels and a vehicle speed; and a steering controller configured to control the electric power steering device and the toe angle changer, the steering controller including: an auxiliary torque calculating unit configured to calculate a target value of the auxiliary torque, and an anomaly detection unit configured to detect an abnormal state of the toe angle changer, the auxiliary torque calculating unit including a first table for calculating the auxiliary torque in a case where the toe angle changer is in a normal sate, and a second table for calculating the auxiliary torque in a case where the toe angle changer is in an abnormal state, wherein, when the anomaly detection unit detects an abnormal state of the toe angle changer, the auxiliary torque calculating unit switches from the first table to the second table and calculates the target value which makes a responsive feeling from the steering torque larger.

According to this steering system, when the anomaly detection unit detects an abnormal state of the toe angle changer, the auxiliary torque calculating unit can switch from the first table to the second table and can calculate a target value so as to increase the responsive feeling from the steering torque.

It is preferable in the above-mentioned steering systems that the steering controller includes an anomaly detection unit configured to detect an abnormal state of the toe angle changer, the auxiliary torque calculating unit includes a first table for calculating the auxiliary torque in a case where the toe angle changer is in a normal state, and a second table for calculating the auxiliary torque in a case where the toe angle changer is in an abnormal state, and when the anomaly detection unit detects an abnormal state of the toe angle changer, the auxiliary torque calculating unit switches form the first table to the second table and calculates the target value which makes a responsive feeling from the steering torque larger.

According to this feature, when the anomaly detection unit detects an abnormal state of the toe angle changer, the auxiliary torque calculating unit can switch from the first table to the second table and can calculate a target value so as to increase the responsive feeling from the steering torque.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Embodiments of the present invention will be described in detail below with reference to the accompanying drawings.

Embodiments

The embodiments of the present invention will be described with reference to FIG. 1 to FIG. 8.

Figure 1:
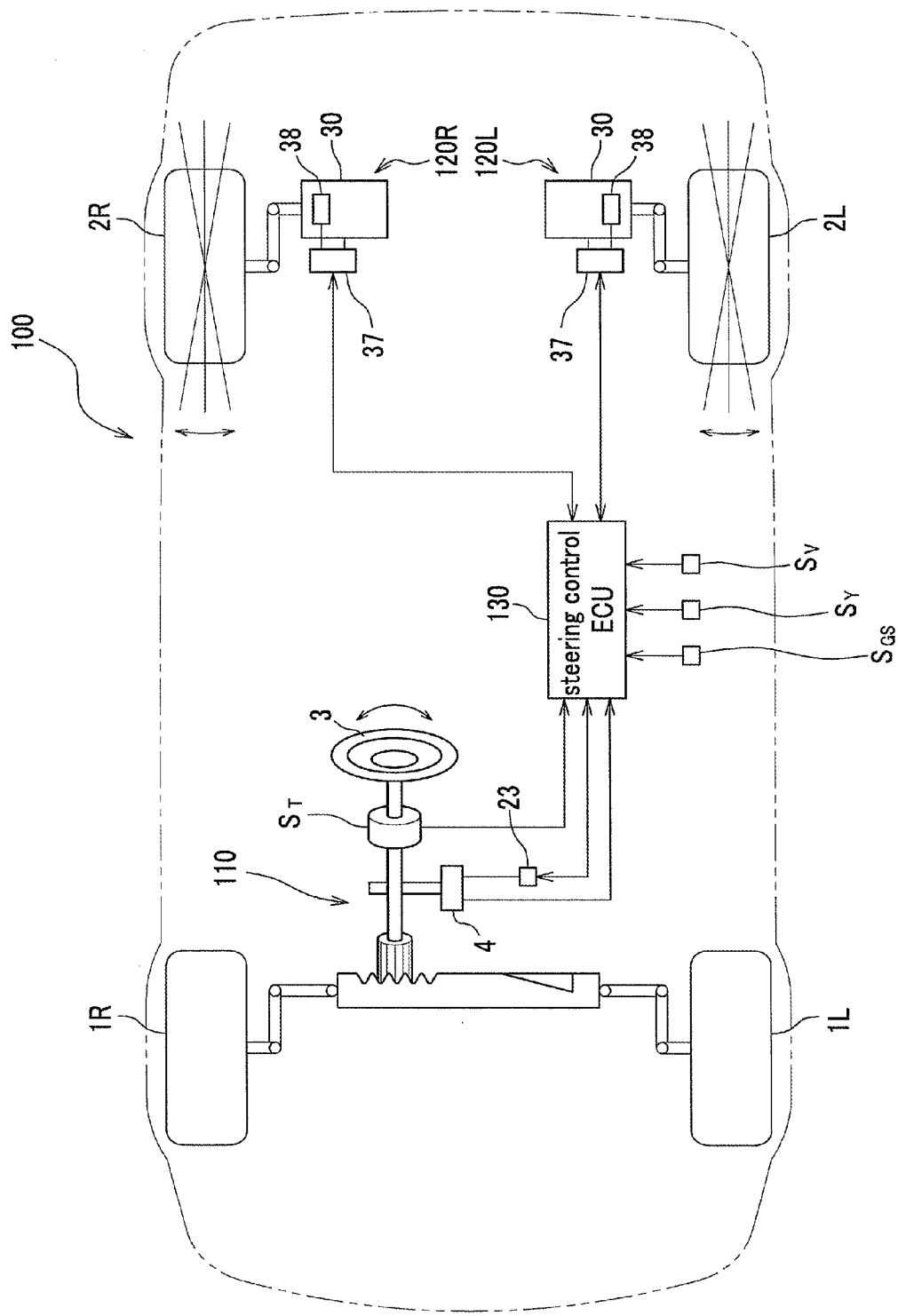
FIG. 1 is a schematic diagram of an entire four-wheel vehicle having a steering system according to an embodiment of the present invention.
Figure 2:
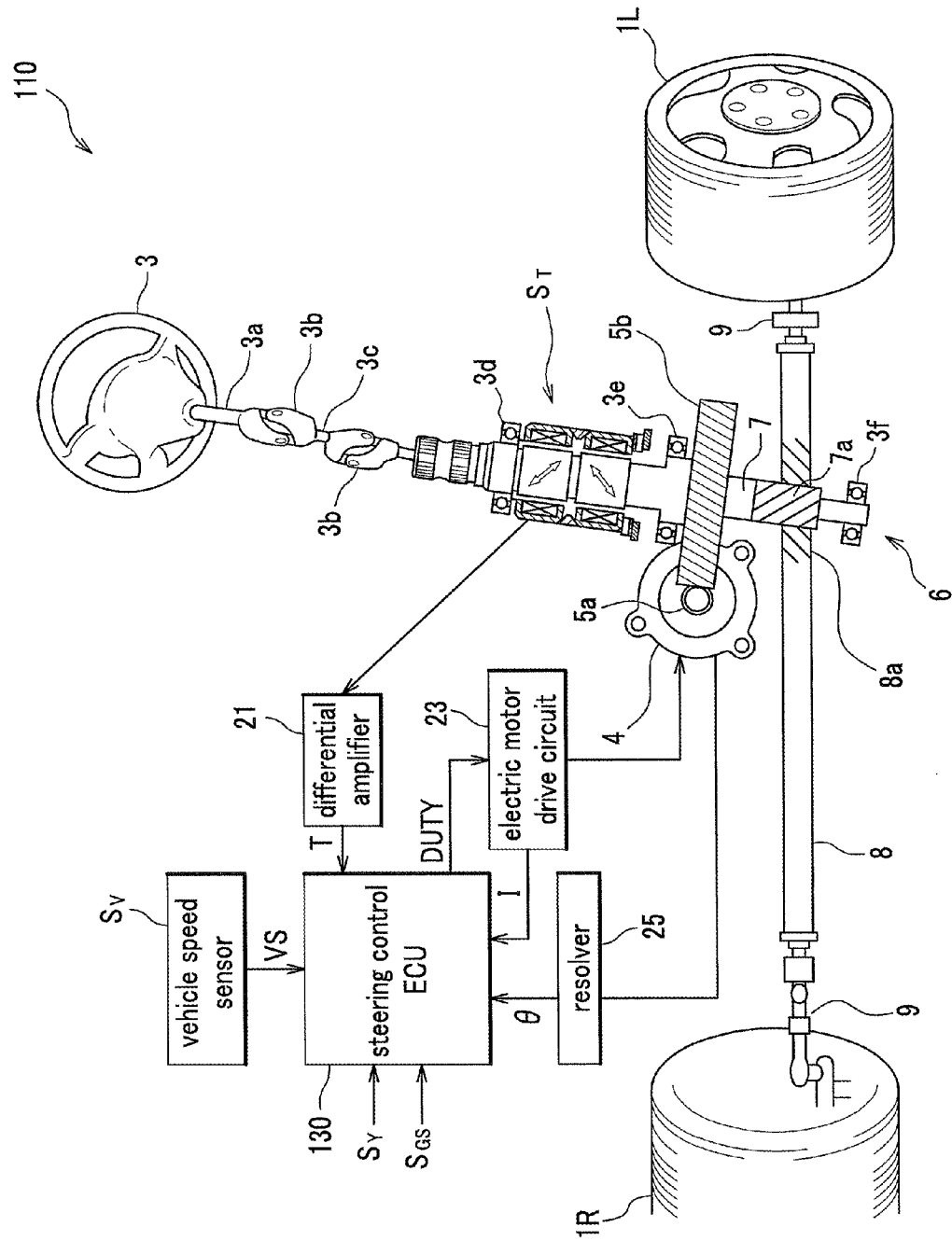
FIG. 2 is a diagram of an electric power steering device in the steering system.

FIG. 1 is a schematic diagram of an entire four-wheel vehicle having a steering system according to an embodiment of the present invention. FIG. 2 is a diagram of an electric power steering device.

As shown in FIG. 1, a steering system 100 includes an electric power steering device 110 having an electric motor 4, which is configured to assist steering of front wheels 1L, 1R by a steering wheel 3; toe angle changers 120L, 120R configured to independently change toe angles of rear wheels 2L, 2R by respective actuators 30, in accordance with a turning angle of the front wheels 1L, 1R by the electric power steering device 110 and a vehicle speed; a steering controller 130 (hereinbelow, referred to as "steering control ECU") configured to control the electric power steering device 110 and the toe angle changers 120L, 120R; and various sensors, including a vehicle speed sensor $S_V$, a yaw rate sensor $S_Y$ and a lateral acceleration sensor $S_{GS}$.

(Electric Power Steering Device)

The electric power steering device 110 includes, as shown in FIG. 2, the steering wheel 3, a main steering shaft $3a$ attached thereto, a shaft $3c$ and a pinion shaft 7, which shafts are connected through two universal joints $3b$. The pinion shaft 7 has a pinion gear $7a$ provided on a lower end of the pinion shaft 7, which engages with rack teeth $8a$ of a rack shaft 8 which can reciprocate in a vehicle width direction. To respective ends of the rack shaft 8, the left front wheel 1L and the right front wheel 1R are connected through tie rods 9, 9. With this configuration, the electric power steering device 110 can change traveling direction of the vehicle by the operation of the steering wheel 3. Herein, the rack shaft 8, the rack teeth 8a and the tie rods 9, 9 constitute a steering wheel turn mechanism.

It should be noted that the pinion shaft 7 is supported by a steering gear box 6: an upper portion, a middle portion and a lower portion of the pinion shaft 7 are supported through bearings 3d, 3e and 3f, respectively.

The electric power steering device 110 also has the electric motor 4 for supplying an auxiliary steering effort to reduce a steering effort required at the steering wheel 3. The electric motor 4 has an output shaft with a worm gear 5a which engages with a worm wheel gear 5b provided on the pinion shaft 7.

In other words, the worm gear 5a and the worm wheel gear 5b constitute a deceleration mechanism. In addition, a rotor (not shown) of the electric motor 4, and the components connected to the electric motor 4, such as the worm gear 5a, the worm wheel gear 5b, the pinion shaft 7, the rack shaft 8, the rack teeth 8a and the tie rods 9, 9, constitute a steering unit.

The electric motor 4 is a three-phase brushless motor formed of a stator (not shown) with a plurality of field coils as well as the rotor which rotates in the stator, for converting electric energy to kinetic energy ($P_M = \omega T_M$).

Herein, $\omega$ represents an angular velocity of the electric motor 4, and $T_M$ represents a torque generated at the electric motor 4. In addition, a relationship between the generated torque $T_M$ and an output torque $T_M^*$ actually obtained as an output can be represented by the following formula (1):

$$T_M^* = T_M - (C_m d\theta_m/dt + J_m d^2\theta_m/dt^2)i^2 \quad (1)$$

where i represents a reduction gear ratio of the worm gear 5a to the worm wheel gear 5b; $\theta_m$ represents the rotation angle of the electric motor; and $J_m$ and $C_m$ represent the inertia moment and the viscosity coefficient, respectively, of the rotor of the electric motor 4.

As is apparent from the formula (1), the relationship between $T_M^*$ and $\theta_m$ can be expressed with $J_m$ and $C_m$ of the rotor of the electric motor 4, which means the relationship is independent of the vehicle properties or the vehicle state.

Herein a steering torque applied to the steering wheel 3 is represented as $T_S$, and a coefficient of an assist amount $A_H$ by the torque generated at the electric motor 4, which has been powered through the deceleration mechanism, is represented as, for example, $k_A(VS)$, which varies as a function of the vehicle speed VS. Since the formula $A_H = k_A(VS) \times T_S$ is established in this case, a pinion torque $T_P$, which is a road load, can be represented by the following formula (2):

$$T_P = T_S + A_H \quad (2)$$
$$= T_S + k_A(VS) \times T_S$$

From this formula, the steering torque $T_s$ can be represented by the following formula (3).

$$T_S = T_P/(1 + k_A(VS)) \quad (3)$$

Therefore, the steering torque $T_S$ is reduced to $1/(1+k_A(VS))$ of the pinion torque $T_P$ (load). For example, if $k_A(0)=2$ with the vehicle speed VS=0 km/h, the steering torque $T_S$ is controlled to one third of the pinion torque $T_P$, and if $k_A(100)$ =0 with the vehicle speed VS=100 km/h, the steering torque $T_S$ is controlled to be equal to the pinion torque $T_P$, which provides a responsive feeling from a steady steering torque, similar to those obtained in the manual steering. In other words, by controlling the steering torque $T_S$ in accordance with the vehicle speed VS, the responsive feeling from the steering torque becomes light when the vehicle runs at lower speed, and steady and stable when the vehicle runs at higher speed.

In addition, the electric power steering device 110 also includes an electric motor drive circuit 23 configured to drive the electric motor 4; a resolver 25; a torque sensor $S_T$ configured to detect (measure) a pinion torque $T_P$ applied to the pinion shaft 7; a differential amplifier 21 configured to amplify the output from the torque sensor $S_T$; and the vehicle speed sensor $S_V$ configured to detect (measure) a vehicle speed.

The electric motor steering control ECU 130 of the steering system 100 has an electric power steering control part 130a (which will be described below; see FIG. 5) as a functional part of the electric power steering device 110, which controls the driving of the electric motor 4.

The electric motor drive circuit 23 has switching elements, such as three-phase FET bridge circuit, and is configured to generate a square-wave voltage based on duty signals (DU, DV, DW) from the electric power steering control part 130a (see FIG. 5), to thereby drive the electric motor 4.

The electric motor drive circuit 23 also has a function to detect (measure) a three-phase electric motor current I (IU, IV, IW) using a Hall element (not shown).

The resolver 25 is configured to detect (measure) a rotation angle $\theta_m$ of the electric motor 4 and to output an angular signal $\theta$, and examples include a sensor for detecting a change in magnetoresistance which is positioned in the vicinity of a magnetic rotor having a plurality of recess portions and projection portions arranged evenly along a circumference of the rotor.

The torque sensor $S_T$ is configured to detect (measure) the pinion torque $T_P$ applied to the pinion shaft 7. The torque sensor $S_T$ is formed of magnetostrictive films adhered to the pinion shaft 7 at two different positions along an axis thereof so as to exhibit opposite anisotropies, and detection coils are arranged with a gap from the pinion shaft 7 along the surface (outer circumference) of the respective magnetostrictive films.

The differential amplifier 21 is configured to amplify a difference in permeability change between two magnetostrictive films detected as an inductance change by the detection coil, and to output a torque signal T.

The vehicle speed sensor $S_V$ is configured to detect (measure) the vehicle speed VS as a pulse number per unit time, and to output a vehicle speed signal VS.

The functional configuration of the steering control ECU 130 will be described later, together with the control by the electric power steering device 110 and the control by the toe angle changers 120L, 120R.

(Toe Angle Changer)

Next, a configuration of the toe angle changer will be described with reference to FIGS. 3 and 4.

Figure 3:
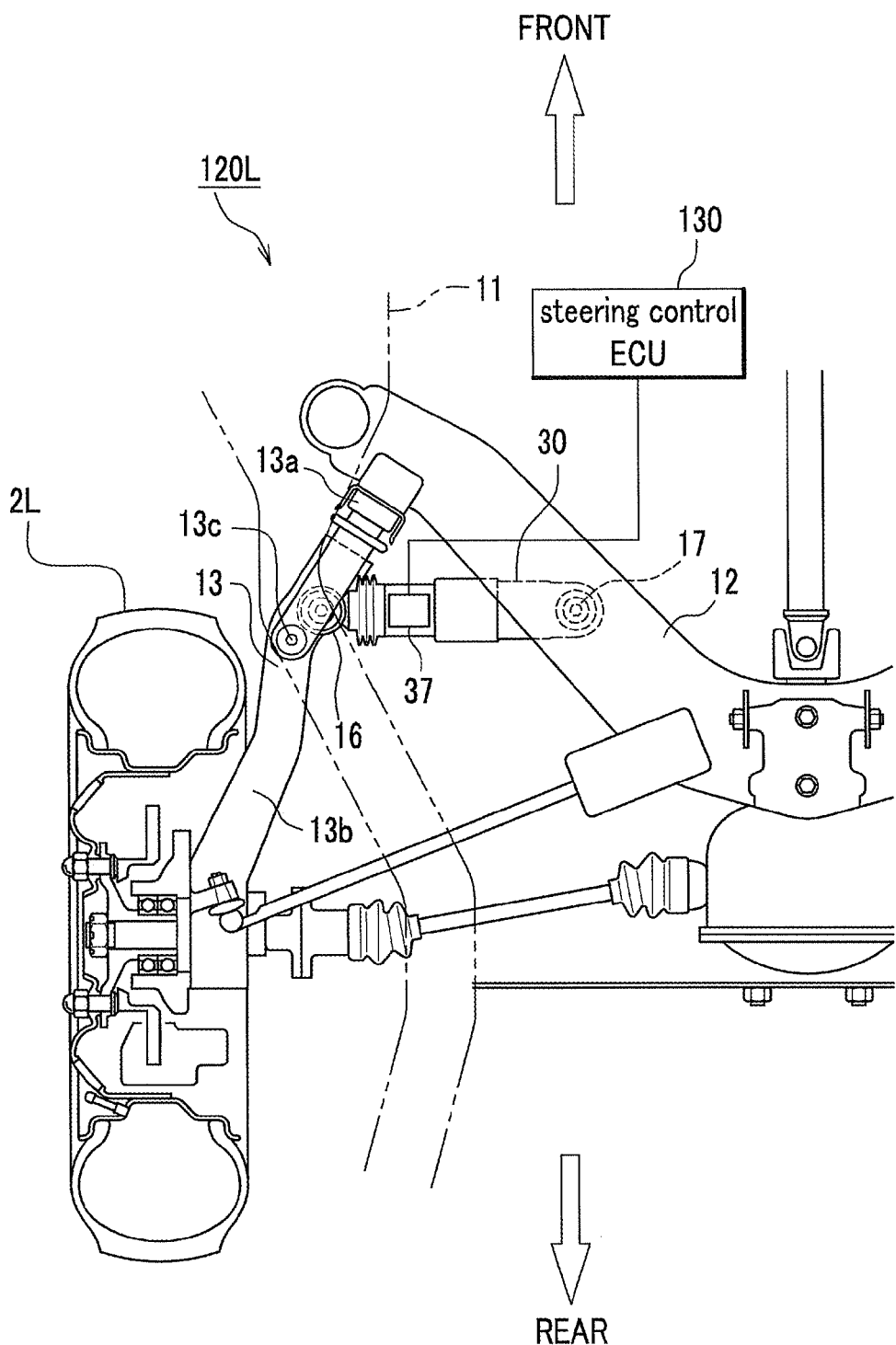
FIG. 3 is a plain view of a toe angle changer on a left rear wheel side in the steering system.

FIG. 3 is a plain view of a toe angle changer on a left rear wheel side. FIG. 4 is a schematic cross sectional view showing a structure of an actuator of a toe angle changer.

The toe angle changers 120L, 120R are installed to the left rear wheel 2L and the right rear wheel 2R of the vehicle, respectively. The toe angle changer 120L is taken as an example, and the left rear wheel 2L is shown in FIG. 3. The toe angle changer 120L includes the actuator 30 and a toe angle change controller (hereinbelow, referred to as "toe angle change control ECU") 37.

It should be noted that FIG. 3 shows the left rear wheel 2L only, but the components are arranged in the same manner (symmetrically) on the right rear wheel 2R. It is also noted that the steering control ECU 130 and the toe angle change control ECUs 37, 37 constitute the steering controller of the present invention.

The cross member 12 extends substantially in the vehicle width direction, and end portions (in terms of the vehicle width direction) thereof are elastically supported by a rear side frame 11 of the vehicle body. A trailing arm 13 extends substantially in the front-rear direction of the vehicle body, and a front end portion thereof is supported by a portion near the terminal (in terms of the vehicle width direction) of the cross member 12. The rear wheel 2L is fixed to a rear end portion of the trailing arm 13.

The trailing arm 13 is formed of a vehicle body-side arm 13a attached to the cross member 12, and a wheel-side arm 13b fixed to the rear wheel 2L, which are connected to each other through a nearly vertical rotation axis 13c. With this configuration, the trailing arm 13 is displaceable in the vehicle width direction.

With respect to the actuator 30, one end portion is attached through a ball joint 16 to a front end portion of the wheel-side arm 13b relative to the rotation axis 13c, and the other end (base end) portion of the actuator 30 is fixed to the cross member 12 through a ball joint 17.

Figure 4:
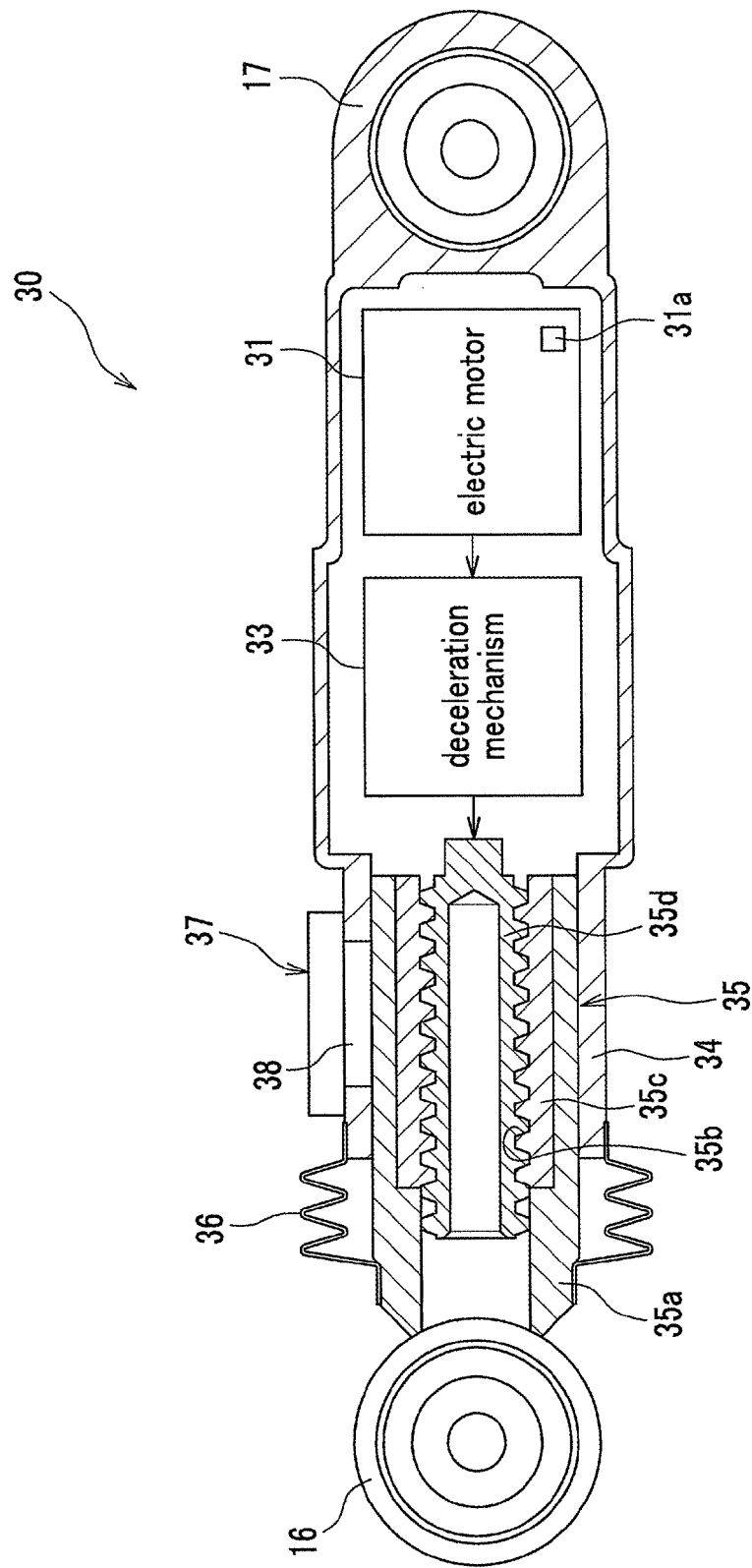
FIG. 4 is a schematic cross sectional view showing a structure of an actuator of a toe angle changer.

As shown in FIG. 4, the actuator 30 includes an electric motor 31, a deceleration mechanism 33, a feed screw portion 35 and the like.

The electric motor 31 may be a brush motor, a brushless motor or the like, which can rotate in both forward and reverse directions. The electric motor 31 has a temperature sensor 31a configured to detect (measure) a winding temperature of a coil of the electric motor 31, and to input a detected temperature signal to a self-diagnostic part 81d (see FIG. 8), which will be described below, of the toe angle change control ECU 37.

The deceleration mechanism 33 is formed of, for example, double planetary gears (not shown) or the like assembled therein. Herein, the self-diagnostic part 81d and the temperature sensor 31a constitute an anomaly detection unit of the present invention.

The feed screw portion 35 includes: a rod 35a in a shape of a cylinder; a nut 35c in a shape of a cylinder which has an internal thread 35b formed in an inner periphery thereof and is inserted in the rod 35a; and a screw shaft 35d which engages with the internal thread 35b and supports the rod 35a in such a manner that the rod 35a is movable in an axial direction.

The feed screw portion 35, the deceleration mechanism 33 and the electric motor 31 are encased in a case body 34 in an elongated cylinder shape. To a portion of the case body 34 on a feed screw portion 35 side, a boot 36 is attached so as to cover both an end portion of the case body 34 and an end portion of the rod 35a, in order to prevent dust or foreign matter from attaching to an outer periphery of the rod 35a exposed from the end portion of the case body 34, and to prevent dust, foreign matter or water from entering the case body 34.

One end portion of the deceleration mechanism 33 is connected to an output shaft of the electric motor 31, and the other end portion is connected to the screw shaft 35d. When the power of the electric motor 31 is transmitted through the deceleration mechanism 33 to the screw shaft 35d to rotate the screw shaft 35d, the rod 35a shifts in a right-left direction in the drawing (axial direction) relative to the case body 34, and thus the actuator 30 contracts or expands. Due to the frictional force caused by engagement of the screw shaft 35d and the internal thread 35b of the nut 35c, a toe angle of the rear wheel is maintained constant, even when the electric motor 31 is not energized and driven.

The actuator 30 also includes a stroke sensor 38 configured to detect (measure) the position of the rod 35a (i.e., amount of expansion/contraction). In the stroke sensor 38, a magnet or the like is embedded so as to detect (measure) the location of the rod 35a by utilizing magnetism. In this manner, by detecting the position of the rod 35a using the stroke sensor 38, the steering angles (toe angle) of toe-in or toe-out of the rear wheels 2L, 2R are separately detected with high accuracy.

With the actuator 30 having the configuration as described above, the ball joint 16 provided on an end portion of the rod 35a is rotatably connected to the wheel-side arm 13b of the trailing arm 13 (see FIG. 3), and the ball joint 17 provided on the base end of the case body 34 (right-hand end in FIG. 4) is rotatably connected to the cross member 12 (see FIG. 3). When the power of the electric motor 31 rotates the screw shaft 35d and the rod 35a shifts leftward (in FIG. 4) (i.e., the actuator 30 expands), the wheel-side arm 13b is pushed outward in the vehicle width direction (left direction in FIG. 3) to thereby leftward turn the rear wheel 2L. On the other hand, when the rod 35a shift rightward (in FIG. 4) (i.e., the actuator 30 contracts), the wheel-side arm 13b is pulled inward in the vehicle width direction (right direction in FIG. 3) to thereby rightward turn the rear wheel 2L.

It should be noted that the position to which the ball joint 16 of the actuator 30 is attached is not limited to the wheel-side arm 13b and the actuator 30 can be attached to any position, such as on a knuckle arm, as long as the toe angle of the rear wheel 2L can be changed. In addition, in the present embodiment, the toe angle changers 120L, 120R are applied to an independent suspension system with semi-trailing arms. However, the present invention is not limited to this type of suspension system, and may be applied to other types of suspension system.

For example, the actuator 30 may be introduced to a side rod of a double wishbone type suspension, or a side rod of a strut type suspension.

In addition, the toe angle change control ECU 37 is unified with the actuator 30. The toe angle change control ECU 37 is fixed to the case body 34 of the actuator 30, and connected to the stroke sensor 38 and the temperature sensor 31a through connectors or the like. Between two toe angle change control ECUs 37, 37, and between the toe angle change control ECU 37 and the steering control ECU 130, there are provided signal circuits connecting them to each other.

To the toe angle change control ECU 37, power is supplied from a power source (not shown), such as a battery, mounted on a vehicle. Also to the steering control ECU 130 and the electric motor drive circuit 23, power is supplied from a power source (not shown), such as battery, which is an independent system of that of the toe angle change control ECU 37.

(Steering Control ECU)

Next, functions of the steering control ECU will be described with reference to FIGS. 5 and 6.

Figure 5:
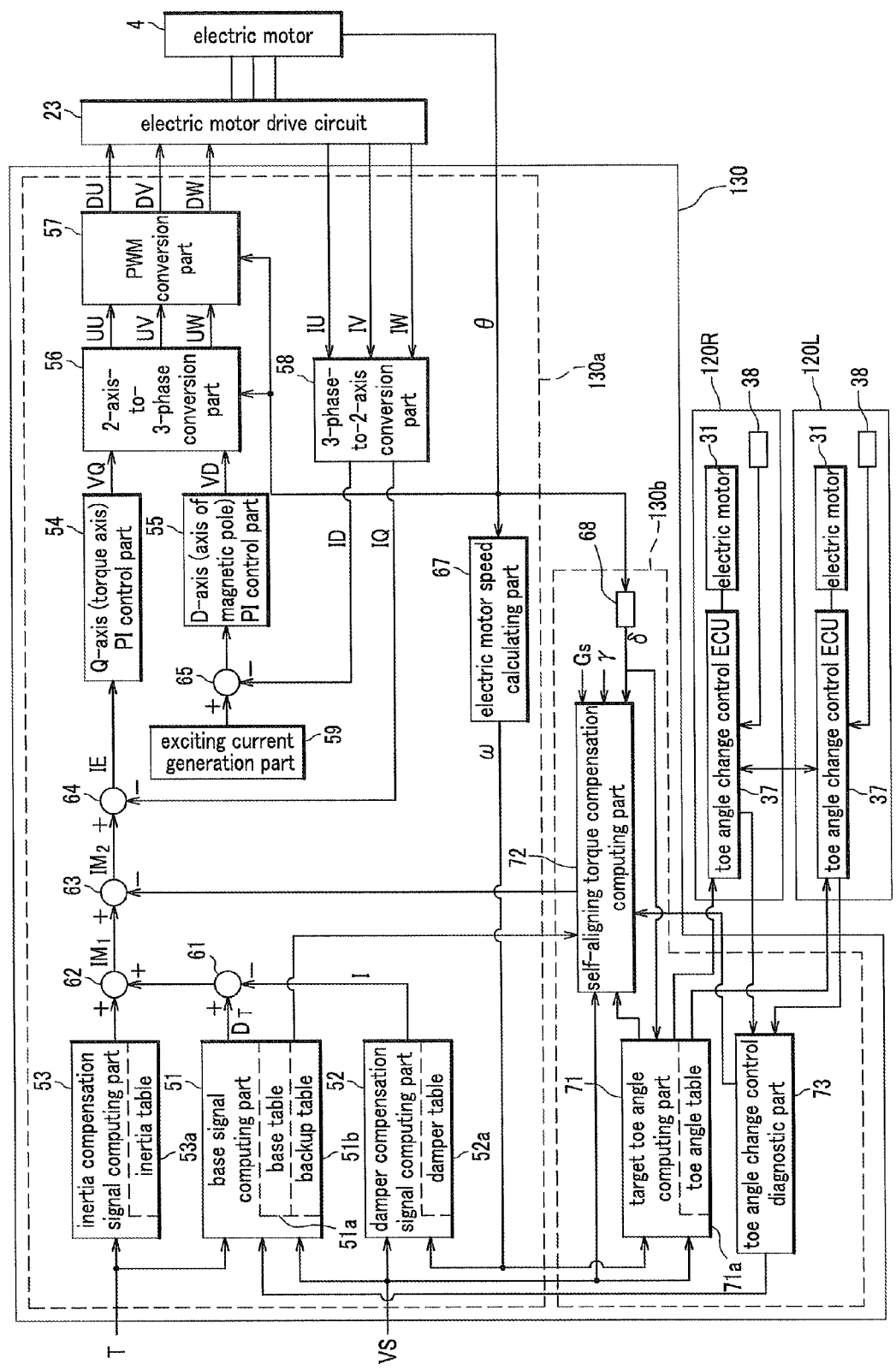
FIG. 5 is a schematic diagram of a control function of a steering control ECU and toe angle changers in the steering system.
Figure 6A:
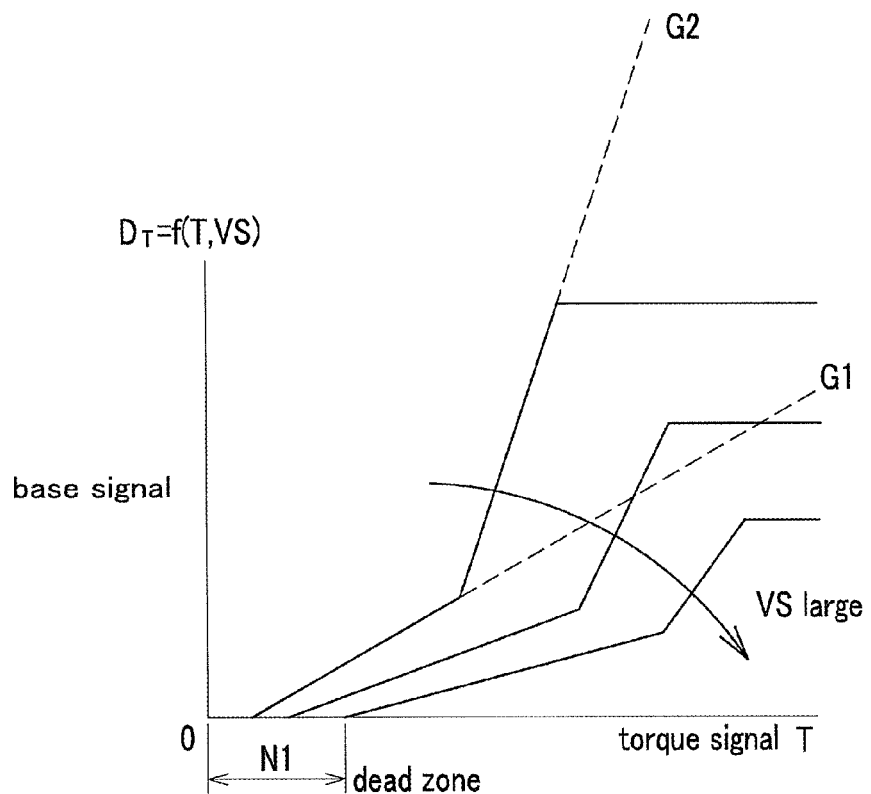
FIGS. 6A and 6B are graphs showing properties of a base signal computing part and a damper compensation signal computing part, respectively.
Figure 6B:
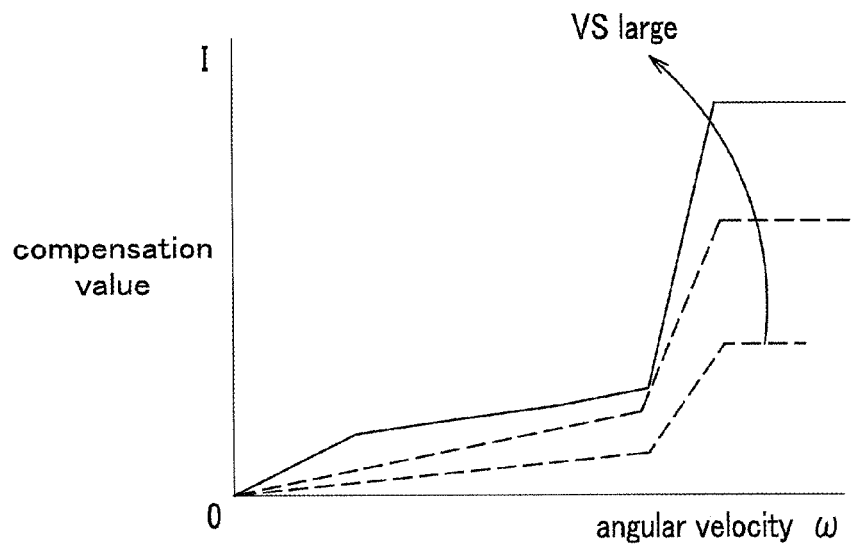

FIG. 5 is a schematic diagram of a control function of a steering control ECU and toe angle changers in the steering system. FIGS. 6A and 6B are graphs showing properties of a base signal computing part and a damper compensation signal computing part, respectively.

The steering control ECU 130 includes a microcomputer with components, such as CPU, ROM, RAM (not shown), and a peripheral circuit and the like.

As shown in FIG. 5, the steering control ECU 130 includes: the electric power steering control part 130a configured to control the electric power steering device 110 (see FIGS. 1 and 2); and a rear wheel toe angle control part 130b, which is a feature of the present invention, configured to compute target toe angles of the rear wheel 2L, 2R and to compute a compensation value for a difference in the self-aligning torque (which will be described below) to be output to the electric power steering control part 130a.

(Electric Power Steering Control Part)

First, the electric power steering control part 130a will be described with reference to FIGS. 5 and 6 (and FIG. 2 where appropriate).

The electric power steering control part 130a includes: a base signal computing part (auxiliary torque calculating unit) 51; a damper compensation signal computing part (auxiliary torque calculating unit) 52; an inertia compensation signal computing part (auxiliary torque calculating unit) 53; a Q-axis (torque axis) PI control part 54; a D-axis (axis of magnetic pole) PI control part 55; a 2-axis-to-3-phase conversion part 56; a PWM conversion part 57; a 3-phase-to-2-axis conversion part 58; an electric motor speed calculating part 67; and an exciting current generation part 59.

The 3-phase-to-2-axis conversion part 58 converts a three-phase current IU, IV, IW of the electric motor 4 detected by the electric motor drive circuit 23 into a two-axis current, including a D-axis which is an axis of magnetic pole of the rotor of the electric motor 4, and a Q-axis which is obtained by electrically rotating the D-axis by 90 degrees. A Q-axis current IQ is proportional to the torque $T_M$ generated at the electric motor 4, and a D-axis current ID is proportional to an exciting current. The electric motor speed calculating part 67 introduces a differential operator to an angular signal θ of the electric motor 4, to thereby generate an angular velocity signal ω. The exciting current generation part 59 generates a target signal for the exciting current of the electric motor 4, and if desired, field-weakening control can be performed by making the D-axis current substantially equal to the Q-axis current.

Based on the torque signal T and the vehicle speed signal VS, the base signal computing part 51 generates a base signal (target value) $D_T$ to be used as a standard reference for a target signal $IM_1$ of the output torque $T_M^*$. The signal is generated from a base table (first table) 51a with reference to the torque signal T and the vehicle speed signal VS, which table had been prepared by experimental measurement or the like using a vehicle which is the same model as that of the present embodiment but has only a front wheel steering function. FIG. 6A is a graph showing a function of the base signal $D_T$, stored in the base table 51a. In the base signal computing part 51, a dead zone N1 is provided where the base signal $D_T$ is set to zero when the value of the torque signal T is small, and the base signal $D_T$ linearly increases along a gain G1 when the value of the torque signal T is larger than the value in the dead zone N1. The base signal computing part 51 increases the output along a gain G2 at specific torque values, and when the torque value further increases, the output is made saturated.

In addition, a vehicle body in general has various road loads (road reactions) depending on the running speed thereof. Accordingly, the gain is adjusted based on the vehicle speed signal VS. The load is heaviest during a static steering (vehicle speed=0), and the load is relatively small at medium and low speeds. Therefore, when the vehicle speed VS becomes higher, the base signal computing part 51 provides the driver with road information with a larger manual steering zone, by making the gains (G1, G2) smaller and the dead zone N1 larger. In other words, in accordance with the increase of the vehicle speed VS, a steady responsive feeling is provided from the steering torque $T_S$. In this case, it is necessary that the inertia compensation be made also in the manual steering zone.

The base signal computing part 51 stores a backup table (second table) 51b, and in response to a command from a toe angle change control diagnostic part 73, which will be described below, generates the base signal $D_T$ to be used as a standard reference for the target signal $IM_1$ of the output torque $T_M^*$, from the backup table 51b with reference to the torque signal T and the vehicle speed signal VS, when the toe angle changers 120L, 120R are in an abnormal state.

The backup table 51b has a function of the torque signal T and the vehicle speed signal VS as also shown in FIG. 6A, but the values of the gains (G1, G2) are smaller by notable amounts than those in the case of the base table 51a, for the same vehicle speed. With this setting, the auxiliary torque becomes smaller, making it easier for the driver to sense an abnormal state.

Referring to FIG. 5, the damper compensation signal computing part 52 is introduced for compensating a viscosity in the steering unit, and for providing a steering damper function for compensating convergence when convergence decreases during high-speed driving, by reading a damper table 52a with reference to the angular velocity signal ω.

FIG. 6B is a graph showing a characteristic function of the damper table 52a, in which the line is formed of a several linear sections and a compensation value I as a whole increases as the angular velocity ω of the electric motor 4 increases. The graph is also characterized in that the compensation value I rapidly increases when the angular velocity ω is in a specific range. Moreover, as the vehicle speed signal VS becomes high, the gains are increased, the angular velocity of the electric motor 4, i.e. the output torque $T_M^*$ of the electric motor 4 in accordance with the speed of the steering wheel turn, decreases by increasing the gain. To put it another way, when the steering wheel 3 is turned away from the home position, a current to the electric motor 4 is reduced; when the steering wheel 3 is returned to resume the home position, a large current is supplied to the electric motor 4. For example, when the steering wheel is further turned away and the angular velocity ω becomes high, the angular velocity ω cannot be immediately reduced because of the inertia of the electric motor 4. In order to prevent this phenomenon, the damper compensation signal computing part 52 makes the current supply to the electric motor 4 larger, to thereby perform an inhibitory control of the angular velocity ω when the steering wheel 3 is resuming the home position. Because of this steering damper effect, convergence of the steering wheel 3 is improved, to thereby stabilize the vehicle properties.

Referring to FIG. 5, an adder 61 is configured to subtract the output signal I of the damper compensation signal computing part 52 from the output signal $D_T$ of the base signal computing part 51, and an adder 62 is configured to add the output signal from the adder 61 and the output from the inertia compensation signal computing part 53 and to output the output signal $IM_1$.

It should be noted that an assist control is performed by a combination of the base signal computing part 51, the damper compensation signal computing part 52 and the adder 61.

The inertia compensation signal computing part 53 is configured to compensate an effect caused by the inertia in the steering unit, in which the torque signal T is computed from an inertia table 53a.

In addition, the inertia compensation signal computing part 53 compensates the lowering of the response caused by the inertia of the rotor of the electric motor 4. To put it another way, when the rotation direction of the electric motor 4 is made to be switched from forward to reverse or vice versa, it is difficult to immediately switch the direction since the inertia tends to maintain the rotational state. Accordingly, the inertia compensation signal computing part 53 controls the timing of switching the rotation direction of the electric motor 4, so as to synchronize the timing of switching the rotation direction of the electric motor 4 with that of the steering wheel 3. In this manner, the inertia compensation signal computing part 53 reduces a response lag in the steering, which may otherwise be caused by inertia, viscosity or the like in the steering unit, to thereby give an excellent steering feeling.

Further, the inertia compensation signal computing part 53 can practically impart the above-mentioned features to various steering properties which varies depending on vehicle characteristics, such as those specifically different among FF (Front engine Front wheel drive) vehicle, FR (Front engine Rear wheel drive) vehicle, RV (Recreation Vehicle) and sedan (or saloon) car, and vehicle states, such as vehicle speed, as well as road conditions.

The output signal $IM_1$ of the adder 62 is a target signal for the Q-axis current which defines the torque of the electric motor 4.

An adder (difference compensation unit) 63 is configured to subtract, from the output signal $IM_1$, a compensation value for the difference in the self-aligning torque which is output from a self-aligning torque compensation computing part 72, details of which will be described later, and to send an output signal $IM_2$ to an adder 64.

The adder 64 is configured to subtract the Q-axis current IQ from the output signal $IM_2$, and to generate a deviation signal IE. The Q-axis (torque axis) PI control part 54 is configured to perform a P (proportional) control and an I (integral) control so as to reduce the deviation signal IE.

An adder 65 is configured to subtract the D-axis current ID from the output signal of the exciting current generation part 59. The D-axis (axis of magnetic pole) PI control part 55 is configured to perform a PI feedback control so as to reduce the output signal from the adder 65.

The 2-axis-to-3-phase conversion part 56 is configured to convert two-axis signal including an output signal VQ from the Q-axis (torque axis) PI control part 54 and an output signal VD from the D-axis (axis of magnetic pole) PI control part 55 into three-phase signal UU, UV, UW. The PWM conversion part 57 is configured to generate duty signals (DU, DV, DW), which is a ON/OFF signal [PWM (Pulse Width Modulation) signal] having pulse widths proportional to the magnitude of the three-phase signal UU, UV, UW.

It should be noted that the angular signal θ of the electric motor 4 is input to the 2-axis-to-3-phase conversion part 56 and the PWM conversion part 57, and a signal corresponding to the magnetic pole position of the rotor is output.

(Rear Wheel Toe Angle Control Part)

Figure 7:
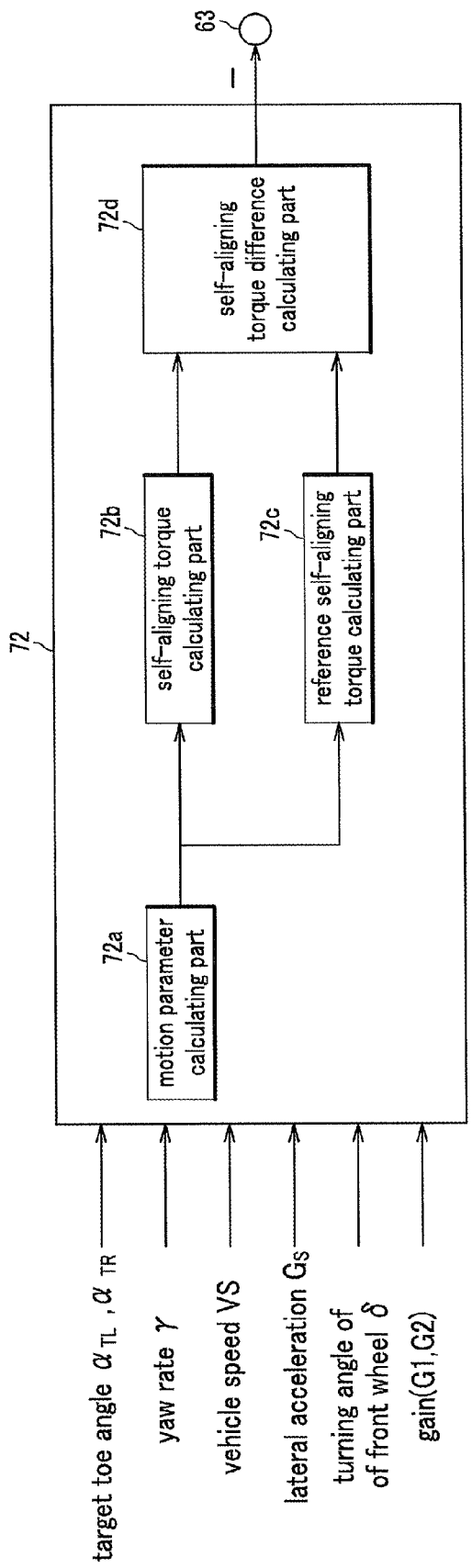
FIG. 7 is a block configuration diagram showing detailed functions of a self-aligning torque compensation computing part.

Next, the rear wheel toe angle control part 130b will be described with reference to FIGS. 5 and 7. As shown in FIG. 5, the rear wheel toe angle control part 130b includes a front wheel turning angle computing part 68, a target toe angle computing part 71, the self-aligning torque compensation computing part 72 and the toe angle change control diagnostic part 73.

The front wheel turning angle computing part 68 is configured to calculate a turning angle δ of the front wheels 1L, 1R based on the angular signal θ output from the resolver 25, and to input the result to the target toe angle computing part 71 and the self-aligning torque compensation computing part 72.

Figure 8:
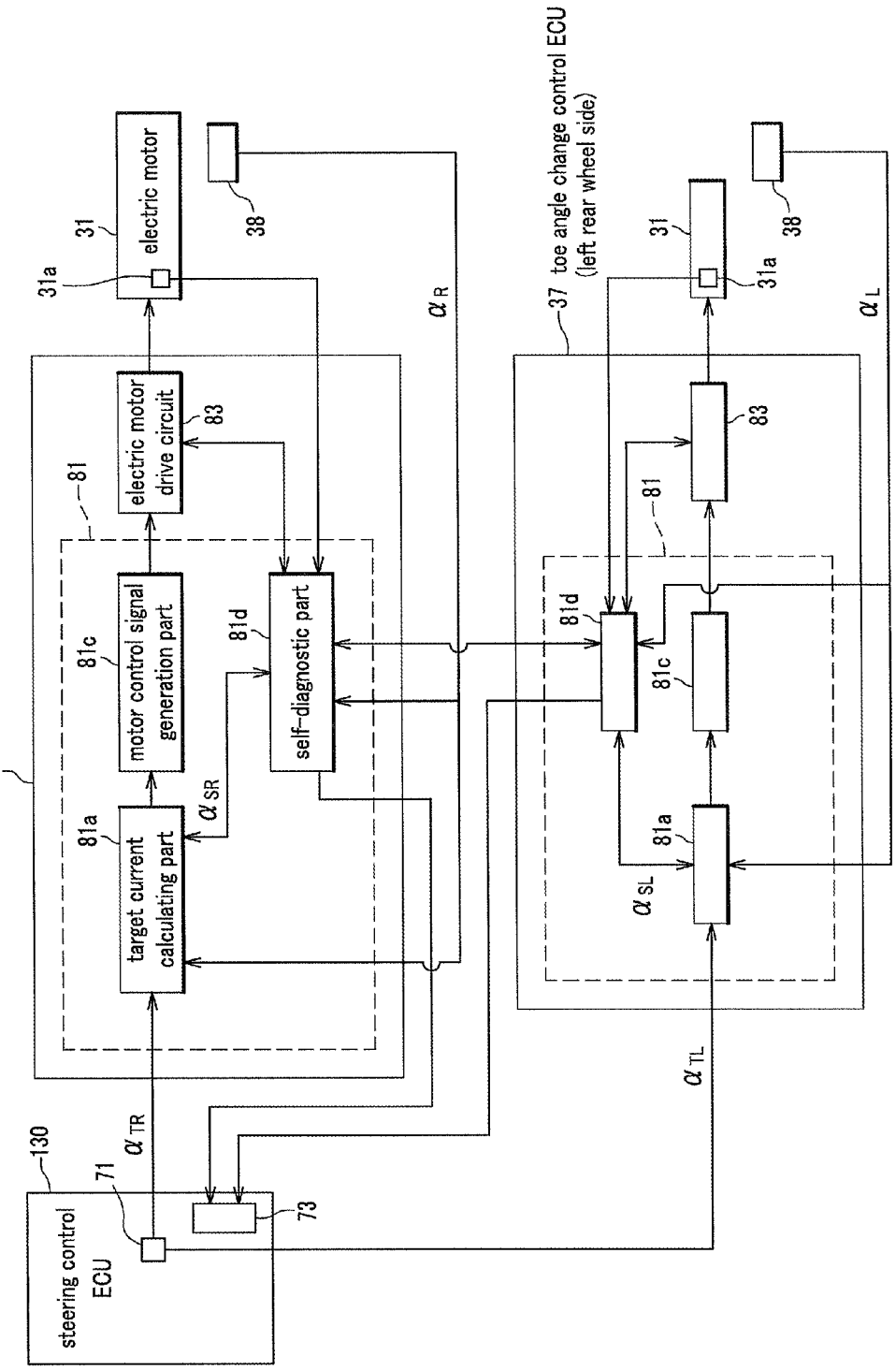
FIG. 8 is a block configuration diagram showing a control function of a toe angle change control ECU of a toe angle changer.

The target toe angle computing part 71 is configured to generate target toe angles $\alpha_{TL}$, $\alpha_{TR}$ for respective rear wheels 2L, 2R, based on the vehicle speed signal VS, a turning angle δ, and a turning angular velocity which is obtained by differentiation of the turning angle δ (this can be easily obtained since the turning angle δ is proportional to the angular velocity ω of the electric motor 4), and to input the target toe angles $\alpha_{TL}$, $\alpha_{TR}$ to the respective toe angle change control ECUs 37, 37 configured to control respective toe angle changes of the left rear wheel 2L and the right rear wheel 2R (see FIG. 8). The target toe angles $\alpha_{TL}$, $\alpha_{TR}$ are generated from the toe angle table 71a, with reference to the turning angle δ, the angular velocity δ' of the turning angle δ and the vehicle speed VS, which table had been prepared for each of the left rear wheel 2L and the right rear wheel 2R in advance.

For example, the target toe angles or $\alpha_{TL}$, $\alpha_{TR}$ are defined by the following formulae (4) and (5):

$$\alpha_{TL}=K_L(VS,\delta',\delta)\cdot\delta \quad (4)$$

$$\alpha_{TR}=K_R(VS,\delta',\delta)\cdot\delta \quad (5)$$

where each of $K_L(VS)$, $K_R(VS)$ represents a front-rear wheel steering ratio which depends on the vehicle speed VS, the turning angle δ and the angular velocity δ' of the turning angle. When the vehicle speed is in a specific low-speed range, each of the target toe angles or $\alpha_{TL}$, $\alpha_{TR}$ of the rear wheel is generated in such a manner that the rear wheels 2L, 2R are in antiphase relative to the front wheels, in accordance with the turning angle δ, to allow the vehicle to turn in a small radius.

In the high-speed range over the above-mentioned specific low-speed range, when an absolute value of the angular velocity δ' of the turning angle is a specific value or less, and at the same time, the turning angle δ is within a specific range (including right and left), the target toe angles or $\alpha_{TL}$, $\alpha_{TR}$ of the rear wheels 2L, 2R are set as the same phase relative to the front wheels, in accordance with the turning angle δ. In other words, the target toe angles or $\alpha_{TL}$, $\alpha_{TR}$ of the rear wheels 2L, 2R are set so as to make the slip angle β small during lane change.

However, in the high-speed range over the above-mentioned specific low-speed range, when the absolute value of the angular velocity δ' of the turning angle exceeds a specific value, or when the turning angle δ is too large to fall outside the specific range (including right and left), the target toe angles or $\alpha_{TL}$, $\alpha_{TR}$ of the rear wheels are set to the antiphase relative to the front wheels, in accordance with the turning angle δ.

It should be noted that, from the viewpoint of the stability in a turn, the target toe angles or $\alpha_{TL}$, $\alpha_{TR}$ generated in the target toe angle computing part 71 do not necessarily follow Ackerman-Jeantaud geometry. Further, when the turning angle δ is 0°, each of the target toe angles or $\alpha_{TL}$, $\alpha_{TR}$ may be, for example, 2°, with the wheels toed in.

The detailed functions of the self-aligning torque compensation computing part 72 will be described with reference to FIG. 7 (and FIG. 1 where appropriate). The self-aligning torque compensation computing part 72 has a motion parameter calculating part (restoring torque calculating unit or reference restoring torque calculating unit) 72a, a self-aligning torque calculating part (restoring torque calculating unit) 72b, a reference self-aligning torque calculating part (reference restoring torque calculating unit) 72c, and a self-aligning torque difference calculating part (difference compensation unit) 72d.

The motion parameter calculating part 72a is configured to calculate a slip angle β of the vehicle body, based on the yaw rate γ from the yaw rate sensor $S_Y$ (see FIG. 1), the vehicle speed VS, the lateral acceleration $G_S$ from the lateral acceleration sensor $S_{GS}$, the turning angle δ, and the target toe angles $α_{TL}$, $α_{TR}$ of the rear wheels 2L, 2R. The slip angle β is obtained from the slip angle table (not shown), with reference to the yaw rate γ, the vehicle speed VS, the lateral acceleration $G_S$, the turning angle δ and the target toe angles or $α_{TL}$, $α_{TR}$ of the rear wheels 2L, 2R, which table had been prepared by experimental measurement or the like in advance. The motion parameter calculating part 72a also has a reference yaw rate conversion table, a reference slip angle conversion table and a reference lateral acceleration conversion table (all are not shown). A reference yaw rate γ* corresponding to the present turning angle δ of the front wheels 1L, 1R and the vehicle speed VS of the vehicle having only a front steering wheel turn function is obtained from the reference yaw rate conversion table with reference to the vehicle speed VS and the turning angle δ; a reference lateral acceleration $G^*_S$ corresponding to the present turning angle δ of the front wheels 1L, 1R and the vehicle speed VS of the vehicle having only a front steering wheel turn function is obtained from the reference lateral acceleration conversion table; and a reference slip angle β* of the vehicle having only a front steering wheel turn function is calculated from the reference slip angle conversion table with reference to the reference yaw rate γ*, the vehicle speed VS, the reference lateral acceleration $G^*_S$ and the turning angle δ.

The calculated slip angle β is input to the self-aligning torque calculating part 72b, and the calculated reference yaw rate γ* and the reference slip angle β* are input to the reference self-aligning torque calculating part 72c.

The self-aligning torque calculating part 72b calculates the restoring moment $T_{S,RTC}$ generated around the kingpin axis (or steering axis, not shown) of the front wheels 1L, 1R using, for example, the following formula (6), and further converts the calculated value into the self-aligning torque $T_{SAT,RTC}$ in terms of the torque around the shaft 3c of the steering wheel 3 (see FIG. 2), as represented by the following formula (7):

$$T_{S,RTC} = 2\xi K_f\left(\beta + \frac{l_f}{VS}\gamma - \delta\right) \quad (6)$$

$$T_{SAT,RTC} = C \cdot T_{S,RTC} \quad (7)$$

where ξ=ξc+ξn with the proviso that a caster trail is represented as ξc and a pneumatic trail is represented as ξn, $l_f$ represents a distance between the front wheel axle and a center of gravity, $K_f$ represents a cornering stiffness of the front wheel tire, C represents a coefficient that converts a moment around the kingpin axis (steering axis) into a torque around the shaft 3c of the steering wheel 3.

In the same manner, the reference self-aligning torque calculating part 72c calculates the reference restoring moment $T_S^*$ generated around the kingpin axis (or steering axis, not shown) of the front wheels 1L, 1R in the case of a reference yaw rate γ*, the present turning angle δ and the reference slip angle β* of a hypothetical vehicle having only a front wheel steering function, using, for example, the following formula (8), and further converts the calculated value into the reference self-aligning torque $T^*_{SAT}$ in terms of the torque around the shaft 3c of the steering wheel 3 (see FIG. 2), as represented by the following formula (9):

$$T_S^* = 2\xi K_f\left(\beta^* + \frac{l_f}{VS}\gamma^* - \delta\right) \quad (8)$$

$$T^*_{SAT} = C \cdot T_S^* \quad (9)$$

The self-aligning torque difference calculating part 72d calculates the compensation value for the difference between the reference self-aligning torque $T^*_{SAT}$ and the self-aligning torque in terms of the torque around the shaft 3c (see FIG. 2) $T_{SAT,RTC}$, calculated above with the formulae (7) and (9), by the following formula (10):

$$(T^*_{SAT} - T_{SAT,RTC}) \times k \quad (10)$$

where k represents a coefficient and a tuning parameter.

The compensation value for the difference between the self-aligning torques, calculated by the formula (10), is input to the adder 63.

It should be noted that the coefficient C may be a specific constant value, or a specific variable which changes depending on the vehicle speed VS or the like. For example, when the base signal $D_T$ is generated in the base signal computing part 51 where the gains G1, G2 are changed in accordance with the torque signal T and the vehicle speed signal VS, it would be convenient if the coefficient C is changed in accordance with the torque signal T and the vehicle speed VS (i.e., the gain), since the same gain is used for the compensation of the self-aligning torque and that of the auxiliary torque.

In this manner, when the vehicle turns with a certain turning angle δ of the front wheels 1L, 1R, the compensation can be made for the difference between the self-aligning torque $T_{SAT,RTC}$ of the all-wheel steering vehicle and the self-aligning torque $T^*_{SAT}$ of the vehicle having a steering function of only front wheels 1L, 1R, in the adder 63 of the electric power steering control part 130a. Therefore, even when a driver who is used to a conventional vehicle having only a front wheel steering function drives an all-wheel steering vehicle, the driver does not feel discomfort in the responsive feeling from the steering torque of the steering wheel 3.

Next, the toe angle change control diagnostic part 73 will be described. The toe angle change control diagnostic part 73 is configured, when receives an anomaly detection signal from the self-diagnostic part 81d (which will be described below, see FIG. 8) of the toe angle change control ECU 37 in the toe angle changer 120L, 120R, to command the self-aligning torque compensation computing part 72 not to compute a compensation but to output a zero signal, and to output a command to the base signal computing part 51 to switch the reference from the base table 51a to the backup table 51b.

(Toe Angle Change Control ECU)

Next, the detailed configuration of the toe angle change control ECU will be described with reference to FIG. 8. FIG. 8 is a block configuration diagram showing a control function of a toe angle change control ECU of a toe angle changer.

As shown in FIG. 8, the toe angle change control ECU 37 has a function to drive control the actuator 30, and is formed of a control part 81 and an electric motor drive circuit 83. Each toe angle change control ECU 37 is connected to the steering control ECU 130 through a communication line, and also to the other toe angle change control ECU 37 through a communication line.

The control part 81 includes a microcomputer with components, such as CPU, RAM, ROM, and a peripheral circuit, and has a target current calculating part 81a, a motor control signal generation part 81c and the self-diagnostic part (anomaly detection unit) 81d.

The target current calculating part 81a of one toe angle change control ECU 37 (on aright rear wheel 2R side) is configured to calculate a target current signal based on the target toe angle $\alpha_{TR}$ of the rear wheel 2R input through the communication line from the steering control ECU 130 and on the present toe angle $\alpha_R$ of the rear wheel 2R obtained from the stroke sensor 38, and to output the result to the motor control signal generation part 81c.

The target current calculating part 81a of the other toe angle change control ECU 37 (on a left rear wheel 2L side) is configured to calculate a target current signal based on the target toe angle $\alpha_{TL}$ of the rear wheel 2L input through the communication line from the steering control ECU 130 and on the present toe angle $\alpha_L$ of the rear wheel 2L obtained from the stroke sensor 38, and to output the result to the motor control signal generation part 81c.

Herein, the target current signal is a current signal required for setting the actuator 30 so as to realize a desired operation amount of the actuator 30 (amount of expansion/contraction of the actuator 30 that allows the rear wheel 2L (or 2R) to have a desired toe angle $\alpha_{TL}$ (or $\alpha_{TR}$)) at a desired speed.

In this manner, the target toe angle $\alpha_{TL}$ (or $\alpha_{TR}$) is set promptly in the target current calculating part 81a, by feeding the present toe angle $\alpha_L$ (or $\alpha_R$) and the target toe angle $\alpha_{TL}$ (or $\alpha_{TR}$) and correcting the target current signal, and by feeding a change in the current value required for the steering wheel turn of the rear wheel 2L (or 2R) which change is caused by the vehicle speed VS, road conditions, motional states of the vehicle, wear status of tire, or the like.

The motor control signal generation part 81c is configured to receive the target current signal from the target current calculating part 81a, and to output the motor control signal to the electric motor drive circuit 83. The motor control signal includes a value of the current to be supplied to the electric motor 31, and a direction of the current. The electric motor drive circuit 83 is formed of, for example, a bridge circuit with FET (Field Effect Transistor), and configured to supply an electric motor current to the electric motor 31, based on the motor control signal.

As shown in FIG. 8, the self-diagnostic part 81d is configured to determine whether or not an abnormal state is detected, based on a position signal of the stroke sensor 38 of the toe angle changer 120L or the toe angle changer 120R (to which the self-diagnostic part 81d of interest belongs), a detection signal from a Hall element of the electric motor drive circuit 83, a temperature signal from the temperature sensor 31a, and a state monitoring of the target current calculating part 81a.

For example, the self-diagnostic part 81d determines that a winding temperature of the electric motor 31 is abnormal when the signal from the temperature sensor 31a exceeds a specific value, and inputs a specific target toe angle $\alpha_{SL}$ (or $\alpha_{SR}$), such as 0°, to the target current calculating part 81a. Herein, the target toe angles $\alpha_{SL}$ and $\alpha_{SR}$ are target toe angles regarding the left rear wheel 2L and the right rear wheel 2R, respectively, when anomaly is detected.

The self-diagnostic part 81d is configured to monitor the detection signals from the target current calculating part 81a and a Hall element of the electric motor drive circuit 83, and to determine whether or not the actuator 30 is locked, based on the position signal from the stroke sensor 38: when it is determined that the actuator 30 is locked, the self-diagnostic part 81d commands the electric motor drive circuit 83 to stop the power supply to the electric motor 31, and inputs the present toe angle $\alpha_L$ (or $\alpha_R$) as the target toe angle $\alpha_{SL}$ (or $\alpha_{SR}$) to the target current calculating part 81a, and then sends an anomaly detection signal and a signal of a mode indicating that a process is made in response to the anomaly detection, to the self-diagnostic part 81d of the other toe angle change control ECU 37.

It should be noted that, for an anomaly detection unit, a watch dog circuit may be provided as a peripheral circuit in addition to the self-diagnostic part 81d, to monitor the control part 81. In this case, when an abnormal state of the control part 81 is detected, the electric motor drive circuit 83 may be commanded to stop a power supply to the electric motor 31, and then an anomaly detection signal may be output to the self-diagnostic part 81d of the other toe angle change control ECU 37.

In addition, the self-diagnostic part 81d of the toe angle changer 120L (or 120R) is configured to check whether or not there is an anomaly detection signal from the self-diagnostic part 81d of the toe angle change control ECU 37 of the other toe angle changer 120R (or 120L). When the anomaly detection signal is received, the target toe angle $\alpha_{SL}$ (or $\alpha_{SR}$) is input to the target current calculating part 81a, based on the signal of a mode indicating that a process is made.

In other words, the self-diagnostic part 81d monitors a signal indicating whether or not the toe angle changer 120L (or 120R) corresponding to the toe angle change control ECU 37 of interest is normally operated, and at the same time, monitors a signal indicating whether or not the toe angle changer 120R (or 120L) corresponding to the other toe angle change control ECU 37 is normally operated. When one of the toe angle changer 120 is found to be in an abnormal state, both of the toe angle change control ECUs 37, 37 perform a process in the same specific mode.

Then, the self-diagnostic part 81d sends the anomaly detection signal to the toe angle change control diagnostic part 73.

As described above, according to the present embodiment, even when a driver who is used to a vehicle having a steering function of only the front wheels 1L, 1R drives a vehicle having the steering system 100 of the present embodiment, the difference between the reference self-aligning torque $T^*_{SAT}$, based on the reference slip angle $\beta^*$ and the reference yaw rate $\gamma^*$ in the vehicle having a steering function of only the front wheels 1L, 1R, and the present self-aligning torque $T_{SAT,RTC}$, based on the slip angle $\beta$ and the reference yaw rate $\gamma$ in the all-wheel steering vehicle, which torques are obtained for the same vehicle speed VS and the same turning angle $\delta$, is used as a compensation value for subtraction in the adder 63 from the target current $IM_1$ of the adder 62, and the obtained target current $IM_2$ is output as the auxiliary torque to the electric motor 4. As a result, the driver can be provided with a responsive feeling from the steering torque very similar to that in a vehicle having only a front wheel steering function.

In addition, the base table 51a to be referred to in the base signal computing part 51 may be not be formed separately for the vehicle to which the steering system 100 is applied and for the vehicle having only a front wheel steering function, and the same base table 51a for the conventional vehicle having only a front wheel steering function may be used. In this case, the preparation of the control data in the base table 51a for the vehicle to which the steering system 100 is applied can be omitted.

Figure 9:
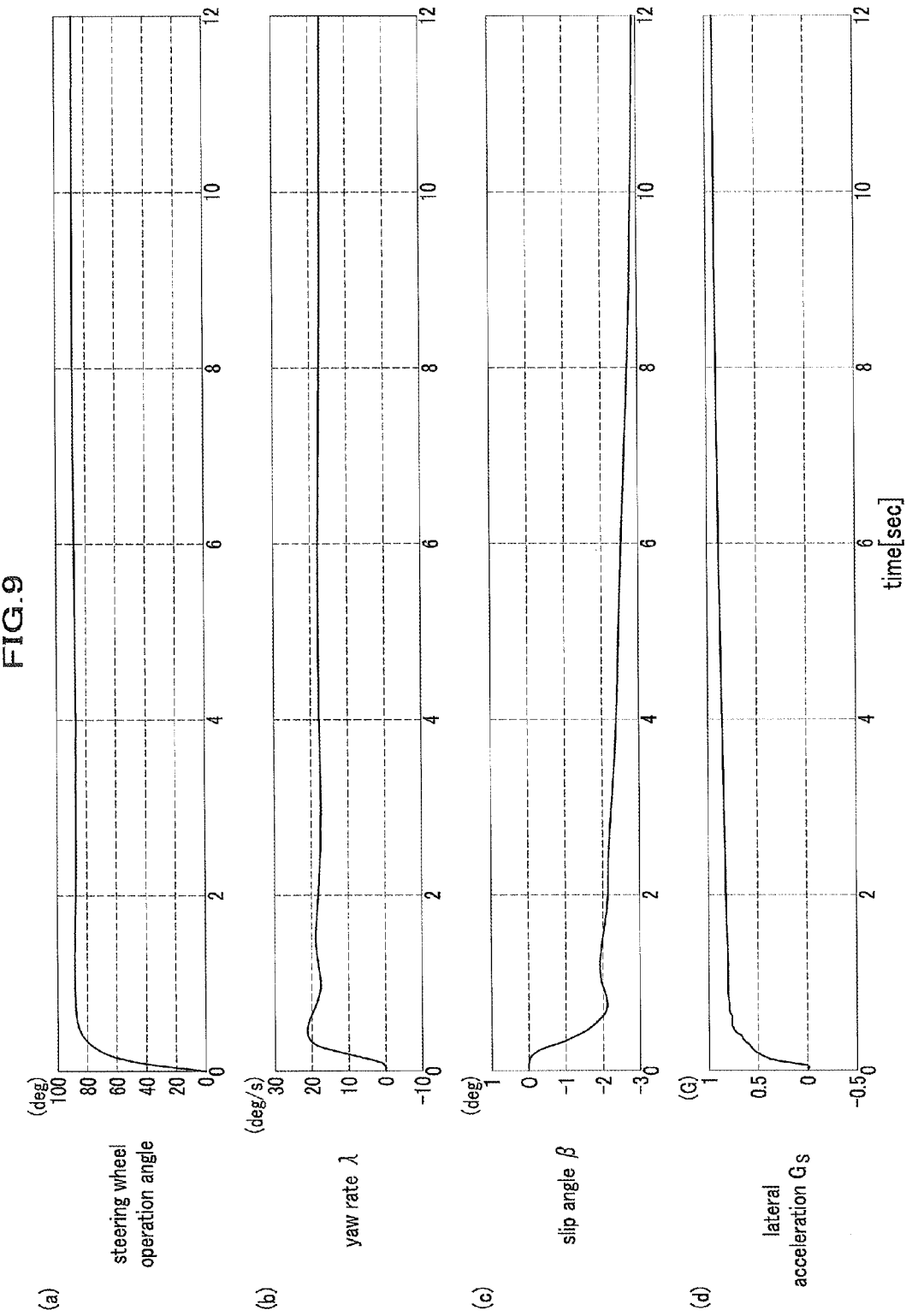
FIG. 9 shows a vehicle motion in accordance with a change in an operation angle, in a case of a vehicle to which the steering system of the present invention is applied: (a) shows a change over time of an operation angle of a steering wheel, (b) shows a change over time of a yaw rate $\gamma$ of the vehicle, (c) shows a change over time of a slip angle $\beta$ of the vehicle, and (d) shows a change over time of a lateral acceleration $G_S$.
Figure 10:
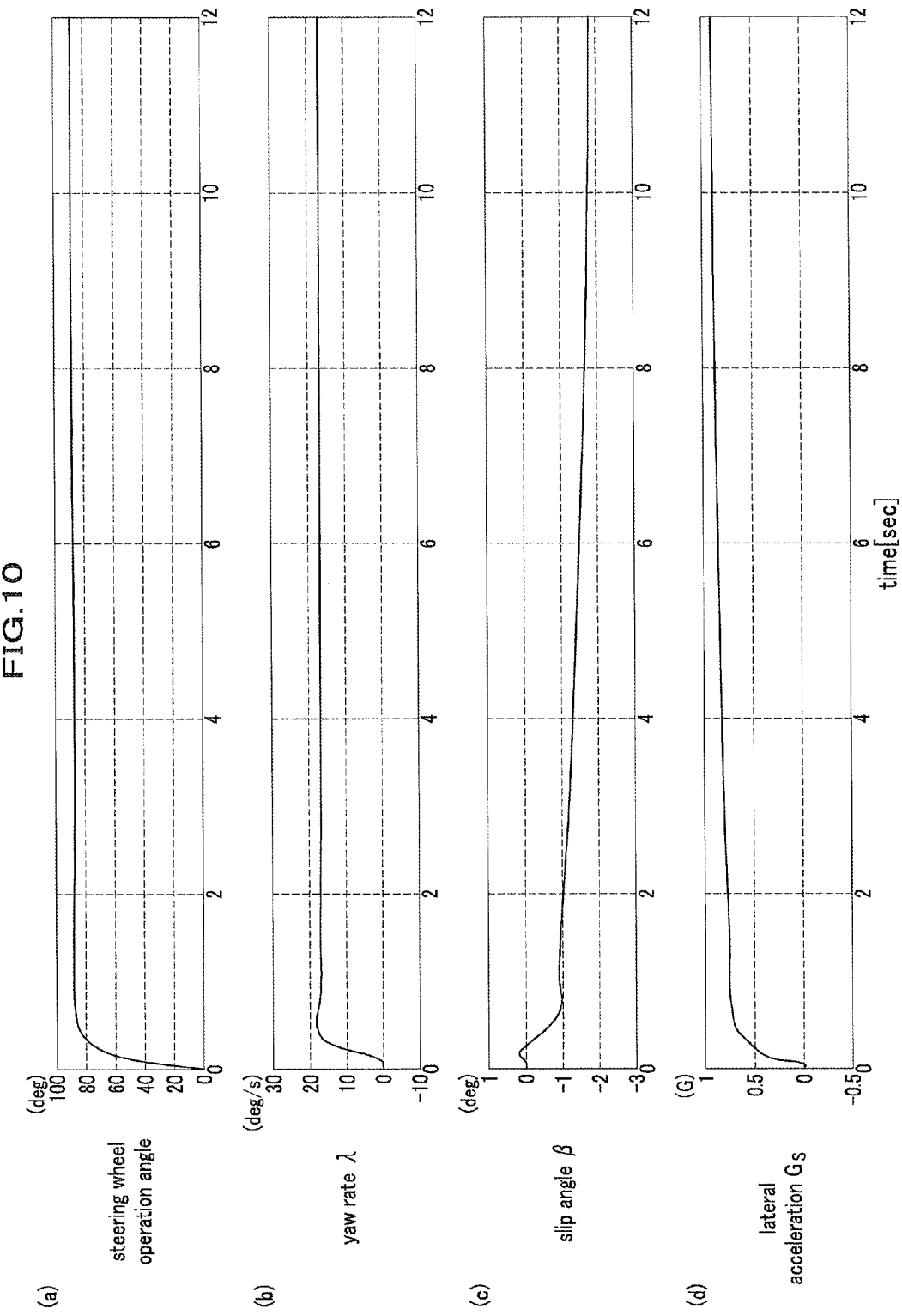
FIG. 10 shows a vehicle motion in accordance with a change in an operation angle, in a case of a vehicle having only a front wheel steering function: (a) shows a change over time of an operation angle of a steering wheel, (b) shows a change over time of a yaw rate $\gamma$ of the vehicle, (c) shows a change over time of a slip angle $\beta$ of the vehicle, and (d) shows a change over time of a lateral acceleration $G_S$.
Figure 11:
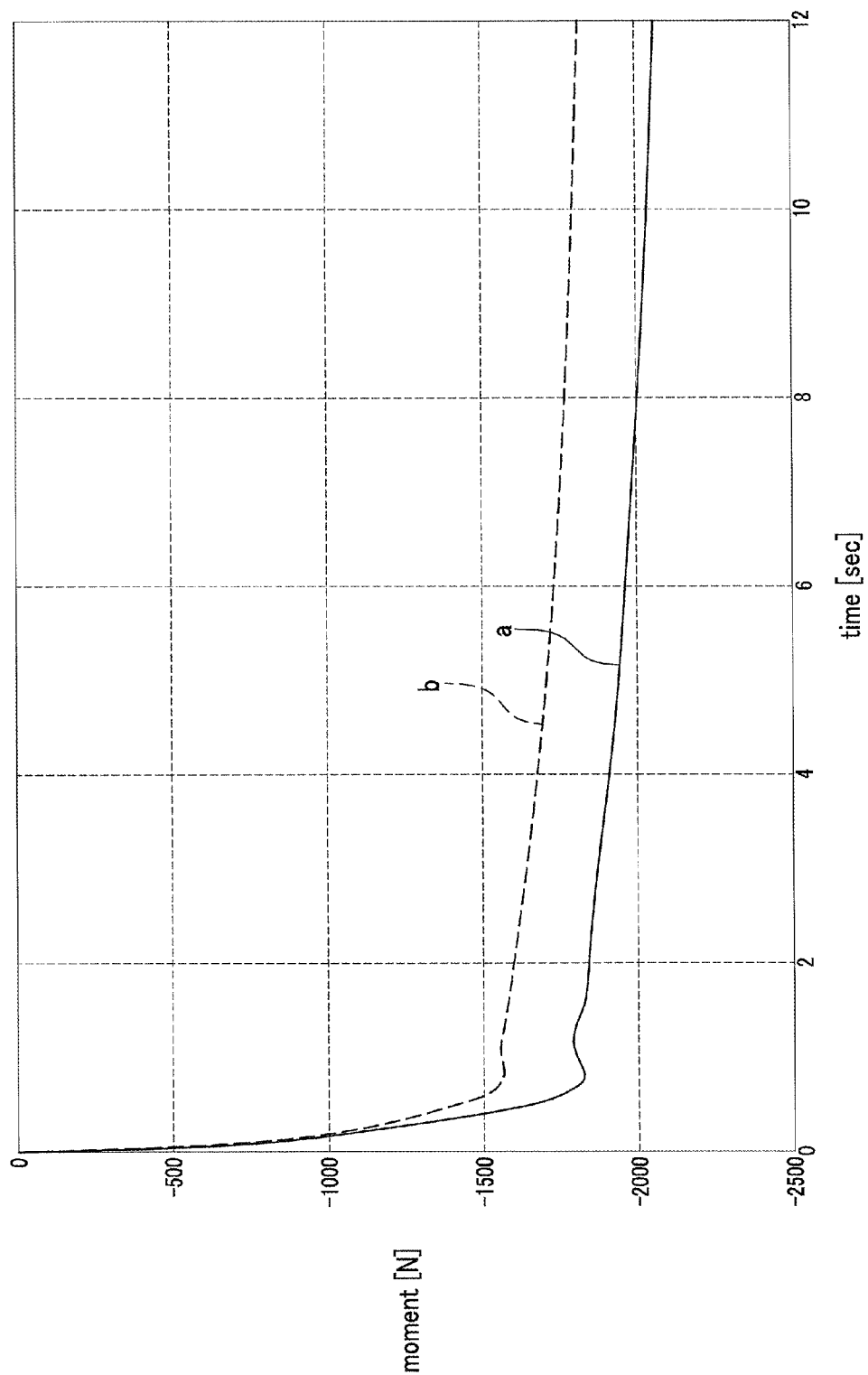
FIG. 11 shows a change over time of restoring moment of two front wheels around kingpin axis (steering axis), in accordance with a set input of the operation angle of the steering wheel shown in FIGS. 9 and 10.

For example, FIGS. 9-11 show changes over time of the yaw rate $\gamma$, the slip angle $\beta$, the lateral acceleration $G_S$ and the moment around the kingpin axis (steering axis), with reference to the change in operation angle $\theta_H$ of the steering wheel 3, for both the vehicle to which the steering system 100 is applied and the vehicle having only a front wheel steering function, in the case where the operation angle $\theta_H$ of the steering wheel 3 is operated up to 100° (deg) at the vehicle speed of 80 km/h.

FIG. 9 shows graphs for a vehicle to which the steering system 100 is applied: (a) shows a change over time of an operation angle $\theta_H$ (deg) of a steering wheel, (b) shows a change over time of a yaw rate $\gamma$ (deg/s) of the vehicle, (c) shows a change over time of a slip angle $\beta$ (deg) of the vehicle, and (d) shows a change over time of a lateral acceleration $G_S$ (G).

FIG. 10 shows graphs for a vehicle having only a front wheel steering function: (a) shows a change over time of an operation angle $\theta_H$ (deg) of a steering wheel, (b) shows a change over time of a yaw rate $\gamma$ (deg/s) of the vehicle, (c) shows a change over time of a slip angle $\beta$ (deg) of the vehicle, and (d) shows a change over time of a lateral acceleration $G_S$ (G).

FIG. 11 shows a change over time of resorting moment of two front wheels around kingpin axis (steering axis), in accordance with a step input of the operation angle of the steering wheel $\theta_H$ of the steering wheel 3 shown in FIGS. 9 and 10, with a comparison being made between the vehicle to which the steering system 100 is applied and a vehicle having only a front wheel steering function.

In the vehicle to which the steering system 100 is applied, the toe angles of the rear wheels 2L, 2R are set to antiphase relative to the turning angle $\delta$ of the front wheels 1L, 1R, and thus the vehicle can turn in a small radius, with a larger yaw rate $\gamma$, slip angle $\beta$ and lateral acceleration $G_S$, as compared with those in the vehicle having only a front steering wheel turn function. In accordance with this, the restoring moment around the kingpin axis (steering axis) becomes larger in the vehicle to which the steering system 100 is applied (curve a in FIG. 11) than in the vehicle having only a front wheel steering function (curve b). Therefore, in such a manner that a driver is provided with a responsive feeling from the steering torque corresponding to such a large restoring moment, the self-aligning torque compensation computing part 72 calculates a compensation value corresponding to the difference in the restoring moment between the curve a and the curve b and the adder 63 makes subtraction based on the compensation value. With this configuration, even when the base signal computing part 51 outputs a target value of the auxiliary torque for the vehicle having only a front wheel steering function corresponding to the curve b, the target signal of the auxiliary torque can be made appropriate for the vehicle having all-wheel steering function, due to the processing in the self-aligning torque compensation computing part 72 and the adder 63.

Further, when the toe angle change control diagnostic part 73 receives an anomaly detection signal of the rear steering wheel turn function from the toe angle change control ECU 37, the steering control ECU 130 switches the table to be used in the base signal computing part 51 from the base table 51a to the backup table 51b, and sets the output signal from the self-aligning torque compensation computing part 72 to the adder 63 to a zero signal. With this configuration, the auxiliary torque becomes smaller and the responsive feeling from the steering torque given to the driver becomes large, making it easier for the driver to sense an abnormal state of the steering function.

When the self-diagnostic part 81d of one of the toe angle change control ECUs 37,37 detects an abnormal state, the self-diagnostic part 81d sends an anomaly detection signal to the other toe angle change control ECU 37, and both of the toe angle changers 120L, 120R are controlled so that the toe angles are fixed. Therefore, it is prevented that a change of only one of the toe angles between the rear wheels 2L, 2R remains controlled, and thus a driving performance is maintained stable even when the toe angle changers 120L, 120R are in an abnormal state.

It should be noted that, when an abnormal state of the rear wheel toe angle changers 120L, 120R is detected and the self-diagnostic part 81d inputs a specific value (such as 0° or 0.5° toe-in) as the target toe angles $\alpha_{SL}$, $\alpha_{SR}$ for an abnormal state to the target current calculating part 81a where the target toe angles or $\alpha_{TL}$, $\alpha_{TR}$ are set, the vehicle is limited to have only a front wheel steering function like a conventional vehicle, and based on the command from the toe angle change diagnostic part 73, the self-aligning torque compensation computing part 72 outputs a zero signal as the compensation signal to the adder 63. In this case, the base signal (target value) $D_T$ output from the base signal computing part 51 in accordance with the command from the toe angle change diagnostic part 73 gives a larger responsive feeling from the steering torque by referring to the backup table 51a. Since the target signal of the auxiliary torque corresponding to the vehicle having only a front wheel steering function is output, the steering properties coordinate with the vehicle properties, leading to the prevention of a sudden shift in the change of the steering feeling that the driver feels.

In the present embodiment, the toe angle change control ECU 37 calculates the target current and is unified with the actuator 30 and thus separately arranged from the steering control ECU 130. With this configuration, the detected value (position information) by the stroke sensor 38 does not have to be sent to the steering control ECU 130, and it becomes possible to feed-back-wise process the position control and current control in the toe angle change control ECU 37. As a result, an independent feedback loop is formed in the toe angle changer 120L (or 120R), and thus it becomes possible that settings can be made in accordance with the individual actuator 30 in a different state from that of the other actuator 30 (i.e., it is not necessary to make settings in accordance with the steering control ECU 130), leading to increase in the processing speed. In other words, the steering control ECU 130 does not output a command including the actuation amount to the toe angle change control ECU 37; instead, the steering control ECU 130 outputs only a signal of the target toe angle $\alpha_{SL}$, $\alpha_{SR}$, resulting in a minimum load on the steering control ECU 130. Moreover, with this configuration, it becomes easy to replace the toe angle change control ECU 37 to those having the electric motor drive circuit 83 corresponding to the actuator 30 having the steering effort specific to the type of that vehicle.

In addition, if the electric motor 31 of the actuator 30 is connected to the steering control ECU 130, the feedback loop becomes significantly long, which leads to a large phase lag, resulting in poor control accuracy. On the other hand in the present embodiment, the control part 81 itself of the toe angle change control ECU 37 is configured to calculate the target current, making the feedback loop shortest, thus improving the control accuracy.

According to the steering system as described above, the responsive feeling from the steering torque by the electric power steering device of the front wheel in the all-wheel steering vehicle is made nearly equivalent to the responsive feeling from the steering torque by the electric power steering device of the front wheel in the vehicle having only a front wheel steering, and the driver who is used to the vehicle having an electric power steering device only for front wheel does not feel discomfort.

In addition, the steering system allows the driver to easily recognize the abnormal state of the toe angle changer by the change in the responsive feeling from the steering torque, when the toe angle changer is in an abnormal state, for example, the toe angle of the rear wheel is locked.

Modified Embodiment

The embodiment of the present invention has been described above. However, the present invention is not limited to the above embodiments, and it is a matter of course that the above embodiments may be properly modified, for example, as described below.

(1) In the present embodiment, in order to obtain the turning angle δ of the front wheels 1L, 1R, the front wheel turning angle computing part 68 makes calculation based on the angular signal θ of the electric motor 4. However, a turning angle sensor may be provided in the steering wheel turn mechanism to directly detect (measure) the turning angle δ. Alternatively, an operation angle sensor may be provided on the pinion shaft 7 and the turning angle δ may be computed from an operation angle signal of the steering wheel 3.

(2) In the self-aligning torque calculating part 72b and the reference self-aligning torque calculating part 72c, the self-aligning torque and the reference self-aligning torque around the shaft 3c are calculated using the formulae (6)-(9). However, the torques can be calculated in different manners.

For example, a calculation model including the vehicle speed VS, turning angle δ, yaw rate γ and lateral acceleration $G_S$ as input parameters may be prepared from actual measurements using an actual vehicle in advance, and the self-aligning torque and the reference self-aligning torque may be calculated using the calculation model. This calculation model may be a nonlinear model, such as a neural network, or may be a linear model, such as a transfer function.

(3) The degree of change in the gain when switching from the base table 51a to the backup table 51b may not be fixed, and based on the difference between the value of the target toe angle $α_S$ ($α_{SL}$, $α_{SR}$) for the rear wheel in an abnormal state and the reference value (such as toe-in value of 0° or 0.5°), the assist amount may be made smaller (i.e., the gains G1, G2 may be made smaller) when the difference is larger.

(4) In the electric power steering control part 130a of the above-described embodiment, the current in the electric motor 4 is controlled by setting the target current. Instead, a target voltage may be set as a voltage to be applied to the electric motor 4. Alternatively, a target torque may be set as a torque to be output by the electric motor 4, to thereby control the current in the electric motor 4. Such a target voltage and a target torque are included in the target signal.

What is claimed is:

1. A steering system comprising:
an electric power steering device which comprises a steering unit of front wheels having an electric motor configured to generate an auxiliary torque in accordance with at least a steering torque, and is configured to transmit the auxiliary torque to the steering unit;
rear wheel toe angle changers capable of changing toe angles of respective right and left rear wheels in accordance with at least a turning angle of the front wheels and a vehicle speed; and
a steering controller configured to control the electric power steering device and the toe angle changers, the steering controller including an auxiliary torque calculating unit configured to calculate a target value of the auxiliary torque and to output a target signal for driving the electric motor, wherein the auxiliary torque calculating unit compensates for a difference between a first self-aligning torque generated at the front wheels of the steering system that includes the rear wheel toe angle changers and a second self-aligning torque generated at front wheels of a hypothetical vehicle without rear wheel toe angle changers.

2. The steering system according to claim 1, wherein the steering controller further comprises
a restoring torque calculating unit configured to calculate the first self-aligning torque based on at least a yaw rate, speed and slip angle of the vehicle and the turning angle of the front wheels,
a reference restoring torque calculating unit configured to calculate the second self-aligning torque based on at least the vehicle speed and the turning angle of the front wheels, and
a difference compensation unit configured to calculate a difference between the first self-aligning torque and the second self-aligning torque and to compensate the target signal with the difference.

* * * * *